United States Patent [19]
Cooper

[11] 4,031,175
[45] June 21, 1977

[54] GLASS BATCH PELLETIZING METHOD

[75] Inventor: Joseph E. Cooper, Brakenridge, Pa.

[73] Assignee: PPG Industries, Inc., Pittsburgh, Pa.

[22] Filed: Mar. 10, 1976

[21] Appl. No.: 665,642

Related U.S. Application Data

[63] Continuation-in-part of Ser. No. 503,130, Sept. 4, 1974, and Ser. No. 622,296, Oct. 14, 1975, each is a continuation-in-part of Ser. No. 398,106, Sept. 17, 1973, abandoned, which is a continuation-in-part of Ser. No. 166,115, July 26, 1971, abandoned.

[52] U.S. Cl. .............................. 264/40.7; 264/117
[51] Int. Cl.² ........................................... B01J 2/12
[58] Field of Search ........................... 264/117, 40.7

[56] References Cited

UNITED STATES PATENTS

| | | | |
|---|---|---|---|
| 3,206,528 | 9/1965 | Coombs et al. | 264/117 |
| 3,542,535 | 11/1970 | Yamamoto | 65/27 |

FOREIGN PATENTS OR APPLICATIONS 696,971  9/1969  South Africa ...................... 264/117

Primary Examiner—Robert F. White
Assistant Examiner—J. R. Hall
Attorney, Agent, or Firm—Dennis G. Millman; William J. Uhl

[57] ABSTRACT

Disclosed is an improved process for pelletizing batch glass making ingredients. The ingredients are pelletized in an inclined, rotating disc pelletizer using concentrated liquid alkali metal hydroxide as a binding agent and as a source of alkali metal oxide. The improvement of the invention resides in adding the glass batch ingredients directly to the pelletizing disc and pelletizing them thereon. Pellets having a 5 to 9 percent by weight moisture content are continuously produced using either fine or coarse naturally ocurring sand. The freshly formed pellets can be fed directly to a furnace or can be easily dried at slightly elevated temperature usually at temperatures not exceeding 500° C. to give a strong, storage-stable pellet.

10 Claims, 6 Drawing Figures

GLASS BATCH PELLETIZING METHOD

CROSS REFERENCE TO RELATED APPLICATIONS

This application is a continuation-in-part of application Ser. No. 503,130 filed Sept. 4, 1974 and application Ser. No. 622,296 filed Oct. 14, 1975, both of which were continuations-in-part of application Ser. No. 398,106, filed Sept. 17, 1973, now abandoned, which in turn was a continuation-in-part of application Ser. No. 166,115, filed July 26, 1971, now abandoned.

BACKGROUND OF THE INVENTION

1. Field of the Invention

The present invention relates to a method for continuously pelletizing glass making ingredients. More particularly, the invention relates to pelletizing glass making ingredients upon an inclined, rotating disc pelletizer usng concentrated liquid caustic as a binder and as a source of all or part of the alkali metal oxide content of the glass.

2. Brief Description of the Prior Art

For years it has been commercial practice to feed loose glass batch material to a glass making furnace. The batch ingredients which usually include sand, limestone, dolomite, soda ash and, optionally, salt cake, rouge, coal and other various ingredients, are first mixed in a dry mixer and then fed to the furnace, usually with a certain amount of cullet. Feeding of dry batch to the furnace in this manner generates dust, not only in the mixing and handling operations prior to the introduction into the furnace, but also afterwards within the furnace. Small particles of sand, soda ash and other ingredients are blown onto the walls of the furnace where they attack the refractory. In additon, particles of batch are blown through the stack and into the atmosphere where they can pose pollution problems. lems.

To overcome these problems, there have been numerous teachings in the prior art to first pelletize the glass making ingredients before feeding them into a furnace. An over view of the prior art is disclosed in an article entitled "Pellets Cut Cost Improve Quality" by W. H. Engelleitner appearing in the March 1972 edition of *The Glass Industry*. This article discloses that it is known to pelletize glass batch making ingredients using various binders such as bentonite, clays, starches, lignin liquors and sodium silicate. However, the incorporation of certain binders into the pellets introduces a foreign material which may affect composition and quality of the resultant glass.

U.S. Pat. No. 3,081,180 to Krinov discloses that glass making ingredients can be pelletized by first putting the soda ash content of a glass batch into a water solution. The aqueous soda ash solution is then added to the remaining dry batch ingredients in a tumbling device where it acts as a binder to pelletize the glass batch.

U.S. Pat. No. 3,206,528 to Coombs et al discloses a method for pelletizing glass batch ingredients by radiantly heating a pelletizing mixture on the pelletizing pan to release moisture from hydrated constituents on the pan so as to partially dissolve portions of the mixture to form a cementing substance for coating of the granular particles of the mixture.

Canadian Pat. No. 745,666 to Blaha discloses a similar technique where part or all of the calcium and magnesium batch material is added in the form of burnt lime or dolomite. The addition of water to the batch ingredients on a rotating pan pelletizer provides a strong pellet chiefly through hydration of the burnt alkaline earths.

Another method for pelletizing glass batch ingredients is the substitution of liquid caustic as a partial or preferably as a total replacement of the soda ash content of the glass batch. Typical teachings in the prior art of such a process are disclosed in U.S. Pat. Nos. 3,542,534 to Yamamoto; 3,726,697 to Mod et al and South African Pat. Nos. 69-6971 to Summer and 70-4564 to Wilhelm and Gustav Eirich.

The Yamamoto patent discloses a two-step procedure for pelletizing glass batch material in which the dry batch is first mixed with caustic soda and water in a pug mill. The mixture is then transferred to a pan pelletizer where it is combined with additonal water to form pellets containing about 12 to 20 percent by weight water. This process has inherent disadvantages when compared to the method of the present invention. First of all, the dry batch and the caustic soda must be mixed with one another before being added to the pelletizer. This means that additional mixing equipment, which is in contact with the corrosive caustic soda, must be used. In addition, high water contents are required to make pellets by the Yamamoto process and the excess water must be removed by a two-step drying process before the pellets can be charged to a glass furnace or stored.

U.S. Pat. No. 3,726,697 to Mod et al discloses a two-step process for granulating glass batch using liquid alkali metal hydroxide as a total or partial replacement for the alkali fluxes contained in the batch. In the Mod et al patent, the alkali metal hydroxide substantially completely reacts with the alkaline earth carbonate contained in the batch to form a moist reaction mixture containing alkaline earth metal hydroxide, alkali metal carbonate and as little unreacted alkali metal hydroxide as possible. The moist mixture is then granulated into a particle and dried. The Mod et al process has a number of disadvantages associated with it. As in the Yamamoto process, the dry batch and caustic must be mixed with one another before granulation. This requires additional mixing equipment which must be contacted with hot corrosive alkali metal hydroxide.

South African Pat. No. 70-4564 discloses pelletizing with at least an 85 percent by weight caustic solution to form pellets containing at the most 5 percent, and preferably less than 3 percent by weight water. However, an 85 percent caustic solution is not commercially available and would require a temperature of greater than 450° F. to insure that the caustic would be a liquid. Thus, added expense and severe caustic handling problems would be introduced into the pelletizing process.

South African Patent 69-6971 discloses a batch method for pelletizing glass batch in which the dry glass batch making ingredients are fed to a rotating drum so as to establish a falling curtain of such ingredients within the drum. Liquid caustic is then sprayed onto the falling curtain to form agglomerates of dry batch which then tumble in the bottom of the rotating drum to form pellets. Although pelletizing in a rotating drum forms spherical pellets the same as pelletizing on a rotating pan, there are significant differences between the two pelletizing apparatus. The main difference is the classifying effect of the pan. Normally, it is required to achieve as narrow pellet size distribution as possible.

According to an article entitled "Possibilities of Influencing Pelletizing Pan Operation and Their Effect on the Properties of the Pelletized Material" by W. Pietsch, appearing in *Aufbereitungs-Technik*, 1966, April, pages 177–191, in the rotating drum, pellets of all sizes are produced since there is no means in the drum to segregate the various size pellets. Thus, it is necessary to screen with the rotating drum. The undersized pellets are returned to the drum and the amount in circulation can be 100 to 400 percent of the finished product. With the pelletizing pan, on the other hand, a classifying effect occurs during the movement of the particles on the pan. The nuclei (small pellets of agglomerating batch material) move in the vicinity of the pan (face), whereas the finished pellets move on top of the charge and are discharged over the edge of the pan. The size of the discharged pellets is quite uniform, being ±25 percent of a nominal size, so that there is no need to carry out classification. Furthermore, the pelletizing process on the open pan can easily be supervised and the size of the finished pellets can be influenced by feed rates, variations in rotational speed, inclination and height of the rim of the pan.

Besides the above disadvantages in the prior art on pelletizing glass batch material, the prior art has not sufficiently addressed itself to pelletizing glass batch material containing coarse sand.

It has been previously believed that since silica sand constitutes from 65 to 75 percent of the glass batch, it would be necessary to use a silica sand ground to a particle size much finer than that normally used in the glass industry. See the Mod et al and Yamamoto patents mentioned above. For example, silica sands used in both the flat and container glass industries east of the Mississippi River are ground so that 95 percent of the sand grains fall between 3 and 120 mesh screen sizes. However, prior pelletizing studies have indicated the need to use either silica flour, ground so that 100 percent of the material passes through 60, 140 or 200 mesh screens, or a fine whole grain sand product such as that mined from relatively unconsolidated deposits of fine grain in the southwest, particularly in Oklahoma. Therefore, a proposed pelletizing operation in eastern United States was faced with high freight costs to transport fine sand from Oklahoma or equally high production costs (additional grinding and classifying) to obtain a finely ground sand from current sources in the east. The ability to utilize the conventionally sized sand, very coarse by prior pelletizing standards, offers an obvious economic incentive. The present invention relates to both fine and coarse sand.

SUMMARY OF THE INVENTION

In accordance with the instant invention, a method is provided for the production of glass batch nodules or pellets of varying size which involves feeding dry glass batch ingredients to a rotating disc pelletizer and contacting such glass batch ingredients in the pelletizer with aqueous solutions of alkali metal hydroxide of a high concentration of alkali metal such as a 50 to 75 percent by weight aqueous sodium hydroxide solution, preferably at an elevated temperature. The method of the invention comprises feeding the dry glass batch making ingredients into a disc pelletizer and delivering separately to the pelletizer the liquid alkali metal hydroxide solution. Pellets of glass batch are formed directly in the pelletizer and product pellets are removed as they are formed. The dry glass batch making ingredients can include coarse sand or fine sand (such as finely ground sand, or fine, unground naturally occurring McLish sand), finely ground dolomite, and limestone. The alkali metal hydroxide solution can provide all or part of the alkali metal oxide requirement of the glass batch. With lower caustic concentrations, i.e., on the order of about 50 to 60 percent by weight, the sodium hydroxide solution should be only a partial source of the $Na_2O$ content of the batch, with a material such as the $Na_2O$ content of the batch, with a material such as soda ash supplying the remainder of the $Na_2O$. With higher caustic concentrations of about 60 to 75 percent by weight, the caustic can be either a partial or a substantially total source of $Na_2O$. Lower caustic soda concentrations introduce proportionately more water on the disc per unit weight of NaOH than do higher caustic soda concentrations and they also freeze at lower temperatures, all of which contribute to increasing the liquidity of the pelletizing mixture. If the caustic concentrations are too low and are used in too great an amount, the liquidity of the pelletizing mixture will be too great, leading to the formation of large, irregularly shaped pellets. The stream of concentrated liquid caustic solution is about 50 to 75 and preferably 60 to 75 percent by weight concentration, is at a temperature of about 60 to 220° F. and preferably 165° to 220° F., and is delivered continuously and simultaneously with the dry batch feed at a substantially steady rate relative to the flow rate of the dry batch feed.

Optionally, a water feed can be delivered to the rotating pelletizing disc to provide additional liquid which may be necessary to maintain and control a continuous balling action of the glass batch ingredients. The moisture content of the pelletizing glass batch ingredients as measured by moisture contained in the freshly formed pellets should be about 5 to 10, preferably 5 to 7 percent to insure the formation of uniformly sized pellets. The mixture of particulate glass batch material wetted with caustic rolls around the pelletizer with the wetted particles of batch tumbling over one another and being bound together by the caustic and its products of reaction with dolomite and limestone to form pellets.

The particle size distribution is extremely critical in the coarse sand-containing batch with the source of alkaline earth oxide having to be finely divided in order to maintain a stable, continuously operating pelletizing pan with the production of uniformly shaped pellets of a predetermined composition. "Course" sand, for the purposes of this application, has the following particle size distribution: at least 40 and up to 70 percent by weight of the sand being between 30 and 60 mesh, with about 20 to 50 percent by weight being between 60 and 100 mesh in size, and no more than 15 percent, usually about 5 to 15 percent by weight of the sand being finer than 100 mesh. In the case of coarse and sand-containing batches the fine limestone and dolomite should have at least 65 and preferably at least 80 percent of the particles minus 100 mesh with at least 50 and preferably at least 65 percent being minus 200 mesh.

DETAILED DESCRIPTION

The process is described for the production of glass batch pellets of high density which are highly resistant to breakage during handling and/or storage. The process for providing pellets involves the utilization of an alkali metal hydroxide in lieu of some or all the normal soda ash and/or alkali metal carbonate component of the glass batch. The alkali metal hydroxide solution, such as aqueous solution of sodium hydroxide, is typically 50 to 75 percent by weight NaOH. The dry batch ingredients are passed to a pelletizing apparatus in which the necessary quantity of alkali metal hydroxide is added, preferably at elevated temperatures, in a quantity sufficient to supply the requisite alkali metal content of the glass batch to thereby form pellets of glass batch in the pelletizing zone. The pellets after removal from the pelletizing zone are preferably dried at a temperature not exceeding 500° C. prior to storage.

Figure 1:
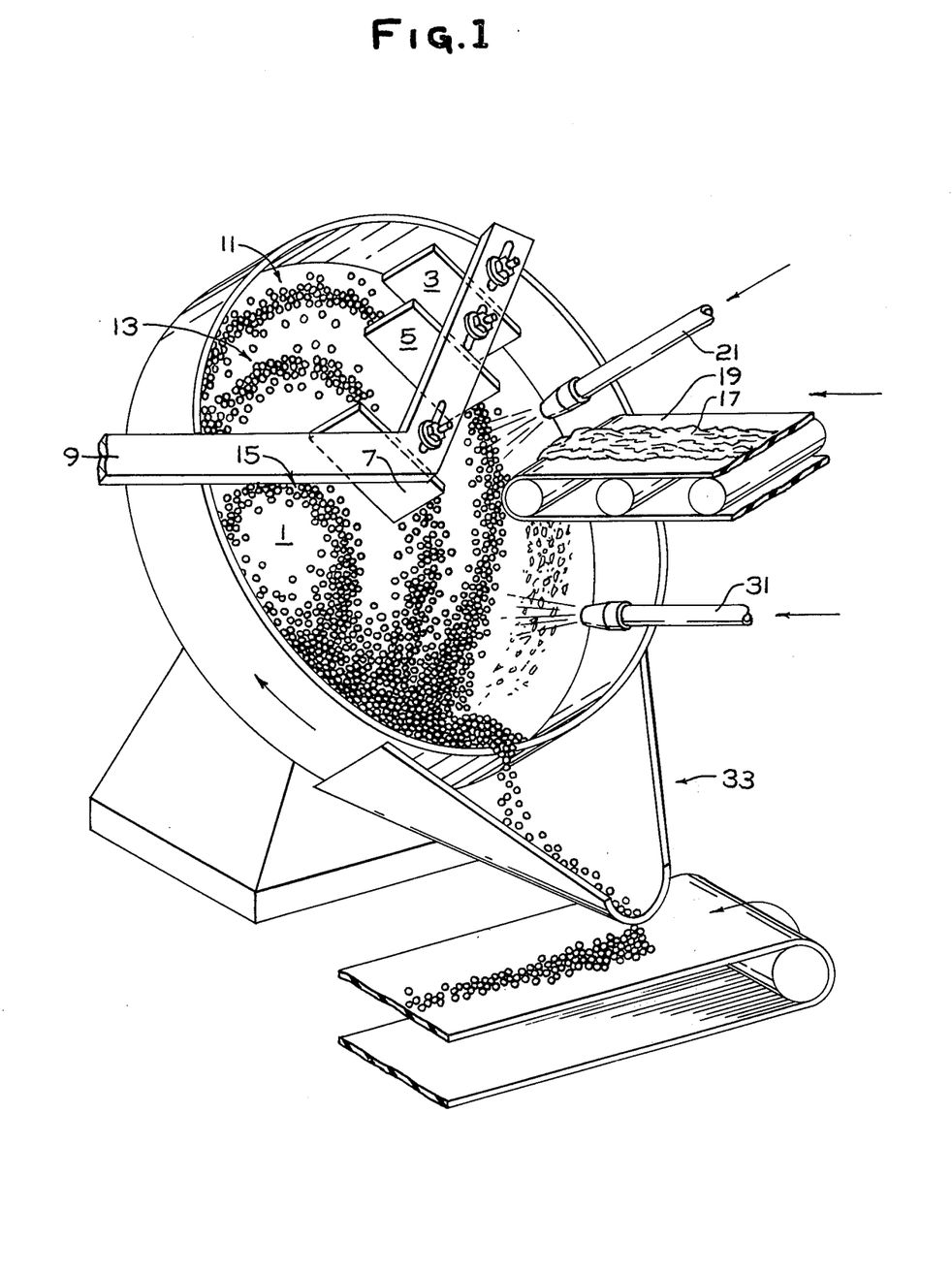
FIG. 1 is a perspective view of the pelletizing device used in the practice of the invention.

Referring to the drawing, FIG. 1 illustrates an inclined, rotating disc pelletizer 1, sometimes called a pan pelletizer, rotating about a central axis containing glass batch material in various stages of agglomeration. The disc or pan rotates generally in a clockwise direction, although it could be set up to operate in a counterclockwise direction.

Figure 2:
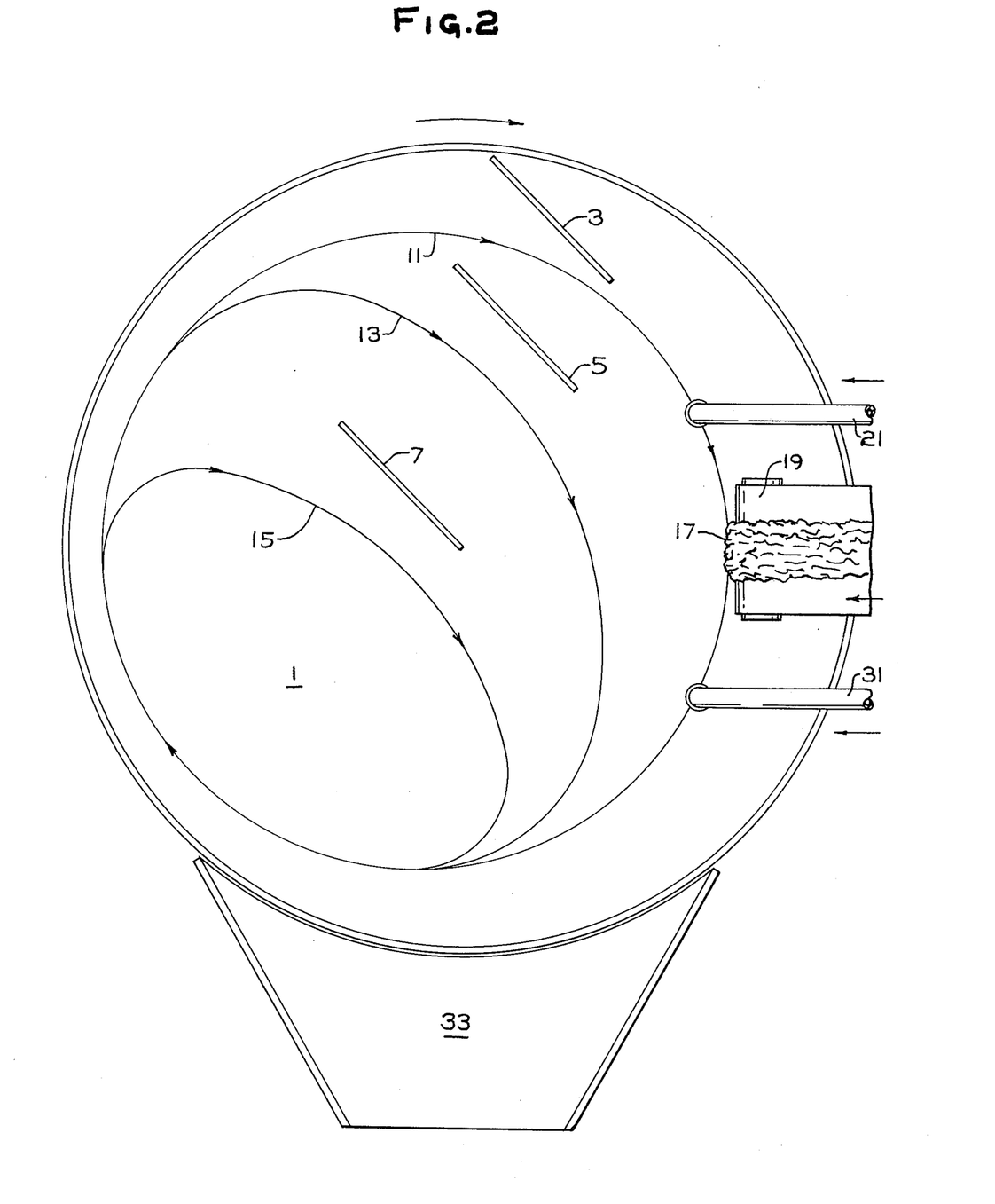
FIG. 2 is a plane view of the rotating disc showing the flow patterns of the various size agglomerates on the disc.

During the course of the pelletizing process, the gravitational and centrifugal forces created on the rotating disc cause the rolling mixture of material to segregate into separate streams. The first stream consists of individual particles of glass batch and nuclei which are very small agglomerates of individual glass batch particles. As shown in FIG. 2, the first stream 11 rolls or flows about the circumference of the disc next to the rim and is directed by plows 3 and 5 to the vicinity of the location of impingement of the caustic and dry particulate feed, 21 and 17, respectively. In this area, first additional caustic binder and then additional dry batch are picked up and the small particles grow in size until they form essentially the second stream. The second stream 13 comprises intermediate size agglomerates which flow about the circumference of the disc with the first stream but which, due to their weight and the influence of plows 5 and 7, are separated from the first stream and flow away therefrom in an inward and downward direction before the first stream passes to the vicinity of the caustic and the dry particulate feed. The second stream 13 recombines with the first stream 11 in the approximate vicinity of the nadir of the rotating disc and picks up additional batch material and binder to form essentially the third stream. The third stream 15 comprises essentially full-size product pellets which flow with the first and second streams about the disc but which, due to their weight and influence of plow 7, are separated from the first two streams before the second stream is separated from the first stream. Due to the differences in mass between the pellets in the three streams, the pellets in the third stream continuously overflow from the disc anywhere in the lower lefthand quadrant of the disc.

In pelletizing glass batch, it has been found that pelletizing conditions on the disc should be carefully controlled to initiate and maintain pelletizing conditions. Some variables which can be regulated to control pelletizing conditions on the pan are: (1) the angle of inclination of the disc and (2) its rotation speed; (3) the consistency of the tumbling material on the disc which in turn is determined by the particle size distribution of the materials on the disc, the caustic concentration and temperature, the liquidity and moisture content on the disc and the reactivity of the materials with one another; (4) the point and rate of feed application; and (5) the positioning of plows or baffles to help create a tumbling action of the materials on the disc.

The angle at which the pan is inclined to a horizontal plane and its rotational speed help to control the size of the pellets which are formed. At a given speed, the greater the angle of the pan from the horizontal plane, the smaller the pellets that are formed. The pellets formed are smaller because the components of gravitational force are greater on each pellet, which tends to roll the pellets out of the pan. For pelletizing glass batch material according to this invention, the angle of inclination should be about 40° to 55°, preferably 45° to 50°, from the horizontal and this angle may be kept constant or adjusted slightly during a given pelletizing operation to assist in maintaining a smooth and regular pan discharge.

At a given angle of inclination, the greater the speed of rotation of the disc, the greater the centrifugal force acting on each of the pellets, and consequently, the larger the pellets that are formed. The speed of rotation of the disc will vary with the diameter of the disc and in general will become slower as the diameter of the disc increases. The proper speed of rotation can be approximated by the method described by H. Klatt in an article entitled "The Adjustment of Pelletizing Pans During Their Operation" appearing in *Zement-Kalk-Gips*, 1958, 11, (4), 144–154. By this method, the speed of rotation (S.R.) may be approximated by:

$$S.R. = \frac{22.5}{\sqrt{P}}$$

where:

S.R. is Speed of Revolution in revolutions per minute, and

P is the diameter of the pan in meters.

This calculation assumes an angle of inclination of about 50° from the horizontal. It has been found for an 8 foot diameter disc, a speed of rotation of 12 to 18 revolutions per minute is satisfactory, and 10 to 25 revolutions per minute for a one meter diameter disc. As with the angle of inclination, the speed of rotation may be kept constant or varied slightly during a given pelletizing run to aid in maintaining an overall satisfactory disc operation and to insure the formation of uniformly sized pellets with consistent physical properties.

The consistency of the material on the pan is determined by the particle size distribution of the materials on the pan, the caustic concentration and temperature, the liquidity and moisture content on the pan and the reactivity of the materials with one another. In general, the sand is the major constituent in the glass batch, constituting about 60 to 80 percent by weight of the entire batch. For soda-lime-silica glass, dolomite and limestone are usually the next most prevalent ingredients (not including soda) constituting about 10 to 30 percent by weight and 2 to 20 percent by weight of the entire batch, respectively. Other ingredients such as rouge, aluminum hydrate, feldspar, nepheline syenite and aplite are usually present in the batch in amounts of up to 10 percent by weight. For partial caustic substitutions, sources of $Na_2O$ such as soda ash are also included in the glass batch. Melting and fining agents such as coal, salt cake, antimony oxide and arsenic oxide are present in amounts of up to 5 percent by weight. Other optional ingredients such as coloring agents are present in amounts of up to 1 percent by weight.

The sand which is used in the pelletizing process of the invention may be either coarse or fine. The particle size of what may be considered a coarse sand by pelletizing standards is such that about 40 to 70 percent by weight of the sand is between 30 and 60 mesh, with about 20 to 50 percent by weight being between 60 and 100 mesh, and no more than 15 percent by weight, usually about 5 to 15 percent by weight being finer than 100 mesh. The mesh sizes are United States Standard Sieve Series. A typical or average composition of such a sand known as minus 30 mesh PGS Berkeley Sand expressed as the percent retained on a U.S. Standard mesh screen is as follows:

+30 mesh, 0 percent by weight
+40 mesh, 7 percent by weight
+60 mesh, 62 percent by weight
+80 mesh, 20 percent by weight
+100 mesh, 6 percent by weight
−100 mesh, 5 percent by weight The particle size range of sand which may be considered fine sand is as follows:

| | |
|---|---|
| +50 mesh | 0–10 percent by weight |
| −50 +80 mesh | 5–15 percent by weight |
| −80 +100 mesh | 25–40 percent by weight |
| −100 +140 mesh | 35–55 percent by weight |
| −140 +200 mesh | 5–35 percent by weight |
| −200 +325 mesh | 5–35 percent by weight |
| −325 mesh | 0–25 percent by weight |

An example of such a fine sand is the McLish sand which is located principally in Oklahoma and has a particle size range as follows:

+30 mesh, 0 percent by weight
+60 mesh, 2 percent by weight
+100 mesh, 45 percent by weight
+200 mesh, 51 percent by weight
−200 mesh, 2 percent by weight The limestone and dolomite used in the pelletizing process of this invention must be finely ground in order to initiate and maintain pelletization. The more finely the material is ground, the easier it is to initiate and maintain pelletization. The fine materials pack between the coarse sand particles and comprise part of the cement upon reaction with the aqueous caustic. The finer the dolomite and limestone, the more reactive they are with liquid caustic and the better the cementing mechanism. It has been found by X-ray powder diffraction analysis of the pellets prepared in accordance with the practice of the invention that the limestone and dolomite react with the aqueous caustic to form sodium carbonate, calcium hydroxide and magnesium hydroxide. The sodium carbonate further reacts with the moisture in the batch to form sodium carbonate monohydrate. The reactions are as follows:

CAUSTIC/LIMESTONE $$2NaOH + CaCO_3 \rightarrow Na_2CO_3 + Ca(OH)_2 \quad (1)$$

CAUSTIC/DOLOMITE $$4NaOH + CaCO_3 \cdot MgCO_3 \rightarrow 2Na_2CO_3 + Ca(OH)_2 + Mg(OH)_2 \quad (2)$$

HYDRATION $$Na_2CO_3 + H_2O \rightarrow Na_2CO_3 \cdot H_2O \quad (3)$$

Analytical results indicate that the extent of caustic reacted is substantially identical in undried and dried pellets, i.e., about 45 percent. Therefore, it appears that the caustic reaction with limestone and dolomite proceeds to the same degree whether or not drying is employed. Analytical results also indicate that no significant amount of carbonation of the caustic by $CO_2$ in the air during pelletizing or in the dryer during drying has occurred. Evidently, the pellets are too impervious for any significant reaction with $CO_2$ except for a probable surface effect which probably accounts for partial drying of the surface wetness that characterizes the pellets as they come off the disc.

Figure 3:
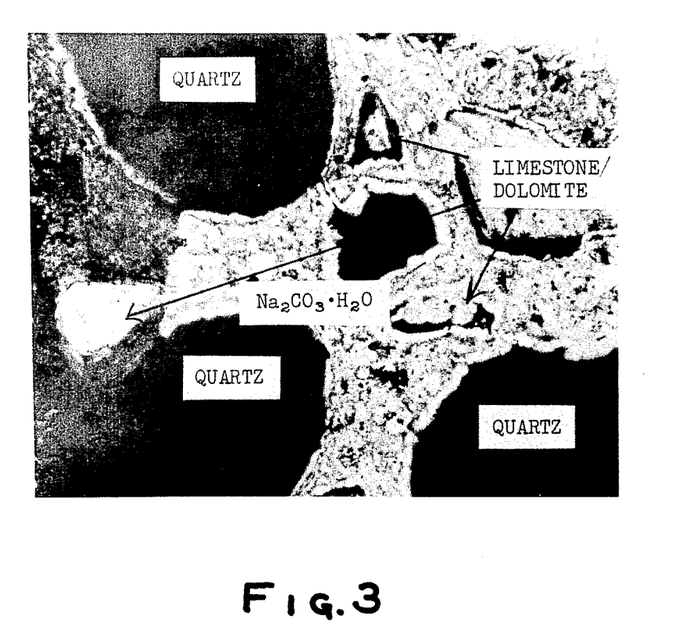
FIG. 3 shows in thin cross-section the crystalline structure of an undried pellet prepared in accordance with the present invention.
Figure 4:
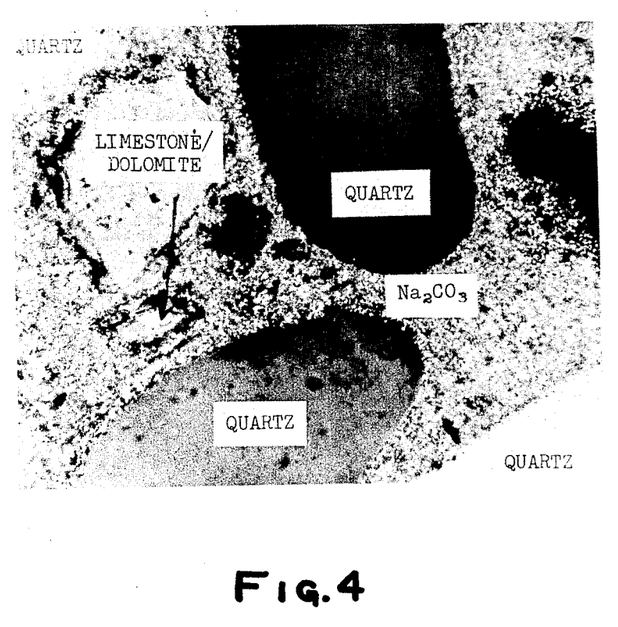
FIG. 4 shows in thin cross-section the crystalline structure of a dried pellet prepared in accordance with the present invention.

Phase relationships in a thin section as shown in FIG. 3 revealed that the undried pellets have large crystalline domains of $Na_2CO_3 \cdot H_2O$. Each domain may surround several sand grains (quartz) and help to form a cement. Drying at higher temperatures, i.e., about 500° F. or greater, can dehydrate these crystalline domains to the small crystallites of $Na_2CO_3$ shown in FIG. 4 which then comprise a part of the cement in the pellet. Drying at lower temperatures, i.e., 200° F. or below, will not dehydrate the $Na_2CO_3 \cdot H_2O$.

Phase relationships in thin section also indicate that unreacted dolomite and minor limestone particles consist of the large particles representing the upper sized fractions of the size distribution. These particles show reaction rims indicating partial reaction with NaOH. It would be expected that the extent of caustic reaction with conventional, granular batch limestone and dolomite, i.e., 90 percent plus 100 mesh, would be substantially less than 45 percent.

Pure 73 percent caustic solution at room temperature gives a very good X-ray diffraction pattern of crystalline $NaOH \cdot H_2O$. Efforts were made to identify crystalline $NaOH \cdot H_2O$ in the undried batch pellets. The fact that no crystallinity was detected is interpreted to mean that frozen caustic was filmed on batch grains and developed no long range crystallinity. Caustic was also not observed in the photomicrograph although its presence in the pellets was established by extracting the caustic soda from the pellets with water and titrating with hydrochloric acid. Presumably, it has filmed out on the batch grains and is not visible in the photomicrographs. This freezing action of the caustic would also contribute to the cementing action.

The mixture of fine limestone and dolomite should have at least 65 and preferably at least 80 percent by weight of the particles minus 100 mesh with at least 50 and preferably at least 65 percent by weight minus 200 mesh (the percentage by weight being based on total weight of limestone and dolomite). The particulate dolomite should be at least 65, preferably at least 80 percent by weight minus 100 mesh with at least 50 and preferably at least 65 percent by weight being minus 200 mesh (the percentage by weight being based on total weight of dolomite). The particulate limestone should have at least 65 and preferably at least 80 percent by weight of the particles minus 100 mesh with at least 50 and preferably at least 65 percent by weight being minus 200 mesh (the percentages by weight being based on total weight of limestone). Suitable commercially available fine ground dolomite and limestone typically have the following screen analyses:

| Dolomite | | Limestone | |
|---|---|---|---|
| Mesh | Percent by Weight | Mesh | Percent by Weight |
| +80 | 0–4 | +100 | 0–15 |
| −80 +100 | 0–7 | −100 +200 | 5–25 |
| −100 +140 | 2–10 | −200 +325 | 20–85 |
| −140 +200 | 10–30 | −325 | 10–75 |
| −200 −325 | 20–70 | | |
| −325 | 10–65 | | |

A specific example of a suitable fine ground dolomite has the following screen analysis:
+60 mesh, 0 percent by weight
+100 mesh, 7 percent by weight
+200 mesh, 15 percent by weight
−200 mesh, 78 percent by weight A specific example of a suitable fine limestone has the following screen analysis:
+60 mesh, 0 percent by weight
+100 mesh, 10 percent by weight
+200 mesh, 15 percent by weight
−200 mesh, 75 percent by weight When coarser limestone and dolomite were used in the pelletizing process for example, particulate limestone and dolomite normally used in flat glass production having about 20 percent of the particles plus 30 mesh with about 65 to 75 percent being minus 30 plus 100 mesh, a continuous pelletization could not be maintained with coarse sand. The pan eventually filled with unpelletized batch material.

When lesser optional ingredients such as salt cake, rouge and coal are added to the glass batch, they can be of the same particle size as normally employed in the production of flat glass.

When caustic is used as a partial substitute for soda ash or, in other words, as the partial source of the $Na_2O$ content of the batch, soda ash is usually included in the dry batch ingredients and is of normal particle size distribution as is usually employed in the flat glass production. With batches having high soda ash contents or low caustic substitution, the soda ash can be further particulated to insure for continuous pelletization.

The dry glass batch making ingredients are first thoroughly mixed with one another, for example, in an Eirich-type mixer, before being fed to the pelletizer. To insure complete pelletization, there should be sufficient fines in the mixture, i.e., at least about 20 percent by weight of the total mixture should be finer than 100 mesh, and at least 15 percent by weight finer than 200 mesh. When using coarse sand, the bulk of the batch, about 60 to 70 percent by weight, should be between 30 and 100 mesh (the percentages by weight being based on total weight of the dry batch mixture). The fines are derived principally from the fine limestone and dolomite.

After the dry glass batch making ingredients are thoroughly mixed with one another, they are fed to the rotating disc pelletizer. The rate of feed of the dry glass batch ingredients will depend upon the size of the disc, its rotational speed and angle of inclination, as well as the final pellet size desired. In any event, the feed of dry batch ingredients should be in a continuous manner and the rate should be constant with respect to the rate of liquid additions throughout the duration of the pelletizing operation so as to maintain a uniform composition in the pellets. As shown in FIG. 1, a conveyor belt-type feeder 19 containing on its upper surface well-mixed glass batch ingredients can be used for this purpose. The speed of the conveyor belt can be adjusted to provide the desired metered flow of ingredients to the disc.

The dry glass batch ingredients 17 are fed to the disc at approximately a four o'clock position (a variation of about one hour in either direction is intended to be included) and in a certain distance from the rim depending on the size of the disc. For example, with the one meter diameter disc, the feed of dry batch ingredients may be in a distance of about 6 inches from the rim. It is estimated that for other size discs, the distance in from the rim may be about 1/6 to 1/8 the diameter of the disc.

The binding agent for the dry particulate bath is concentrated aqueous solution of caustic of 50 to 75 and preferably 60 to 75 percent by weight concentration. Concentrated aqueous caustic is also a source of $Na_2O$ for the glass batch and can be the sole or partial source, with such materials as soda ash (sodium carbonate) and salt cake ($Na_2SO_4$) providing essentially the rest. Preferably, the aqueous caustic is used as the total source of $Na_2O$ and by this it is meant that aqueous caustic is a total replacement for soda ash. The amount of aqueous caustic used will depend principally on the amount of $Na_2O$ required in the resultant glass composition. It has been found that when 73 percent aqueous caustic soda solution is used, pellets can be produced with about a 10 to 18 percent by weight soda content calculated as $Na_2O$. It is estimated that pellets having soda contents of 5 to 25 percent by weight can be made by the method of the invention. Pellets with soda contents lower than 5 percent by weight would be difficult to make because of poor binding action resulting from insufficient caustic. Pellets with higher soda concentrations, that is, on the order of 20 to 25 percent by weight, are preferably made by a partial substitution of the aqueous caustic for sodium carbonate. If the aqueous caustic were used as a total substitution for the sodium carbonate at these higher soda levels, a large free volume of liquid would be introduced into the disc resulting in a very fluid or wet mixture which would not readily pelletize. With a high excess of liquid present, the material on the pan forms a mud which will not tumble to form pellets.

The caustic concentration should be carefully controlled within the above-described range, that is, between 50 and 75, preferably between 60 and 75 percent by weight. Commercially available 73 percent by weight concentration is most preferred. Lower concentrations, that is, lower than 50 percent by weight, introduce too much liquid onto the disc, giving a wetter mixture than desired for pelletizing. Higher concentrations of caustic are undesirable because they are not readily commercially available and because of the excessively high tempratures required to insure liquidity. With lower caustic concentrations, that is, on the order of 50 to 60 percent, caustic should be used as a partial source of the $Na_2O$ content of the glass with materials such as sodium carbonate providing the remainder of the Na$_2$O. Total use of such low concentrated caustic solutions results in too much liquidity or too wet a mixture which will not readily pelletize. With higher caustic concentrations, i.e., on the order to 60 to 75 percent, the caustic can be a partial or total substitute for soda ash. Preferably, the substitution will be total, however, if partial, additional water may be added to the pan to insure sufficient liquidity and a uniform continuous pelletizing operation.

In the preparation of glass batch pellets in accordance with the present invention, the aqueous alkali metal hydroxide solution is sprayed onto the contents of the pelletizing disc at a temperature sufficiently high to maintain the solution in a readily flowable condition. In the case of the relatively viscous commercially available 73 percent concentration of sodium hydroxide, it has been found desirable to spray the solution at a temperature between about 60° C. and 90° C. Below 60° C., the 73 percent solution begins to freeze, which can increase the pumping load excessively and increase the chances of clogging the sprayer and the supply pipes. Above 90° C., too much of the caustic soda can remain as a liquid on the disc, producing a wet disc which leads to the production of large, irregularly shaped lumps or masses. Also, unnecessarily high caustic temperatures should be avoided because of the corrosive effect on the piping system. At lower caustic concentrations, heating of the solution is less important, and may not be needed at all. For example, a 50 percent solution of sodium hydroxide may be sprayed at room temperature or lower without undue difficulty since the freezing point of such a solution is at about 10° C. It is preferred, however, to heat even the dilute solutions to at least about 40° C. to guarantee against any localized freezing and clogging in the piping and spray nozzle.

Figure 5:
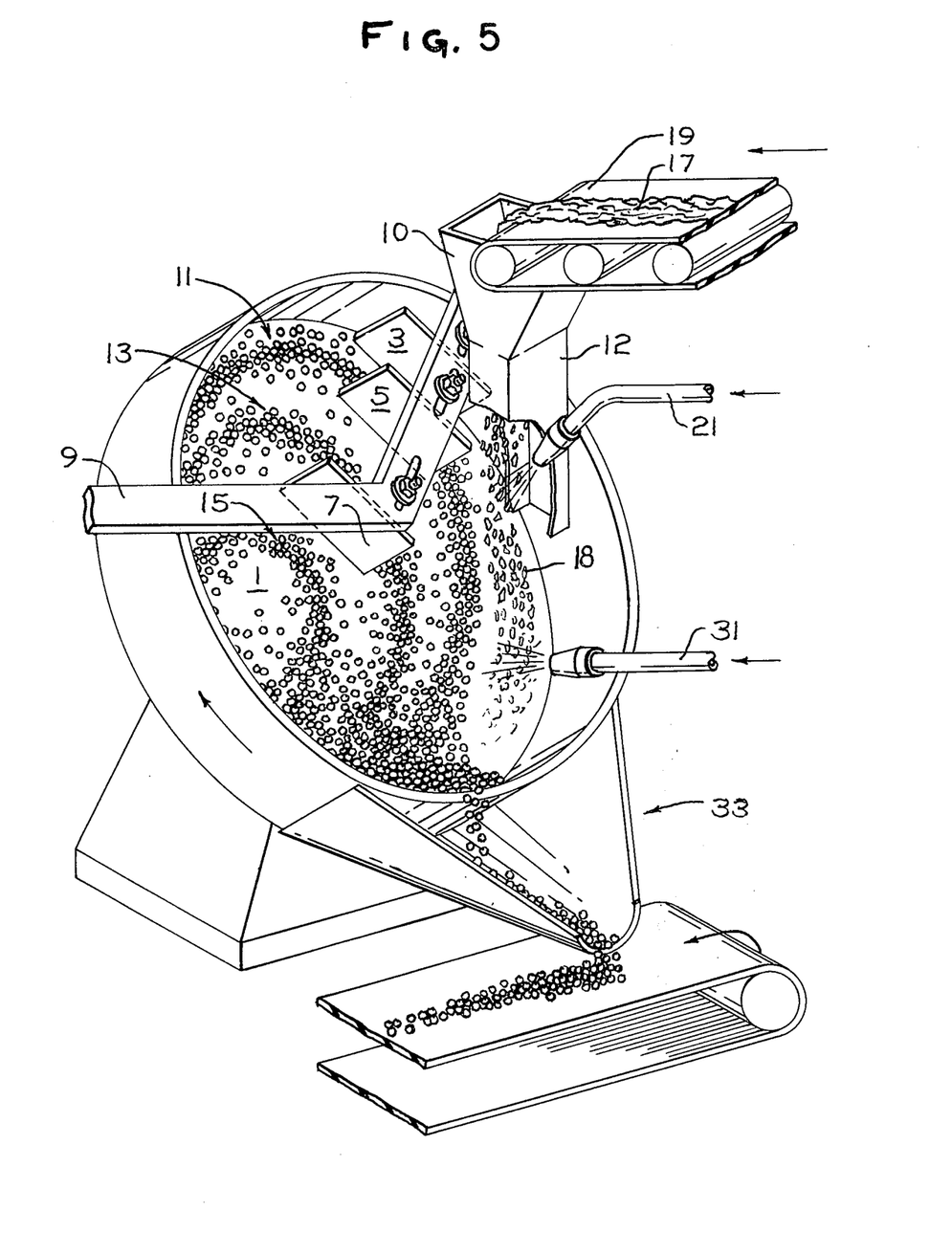
FIGS. 5 and 6 are perspective views of alternate pelletizing devices used in the practice of the invention.
Figure 6:
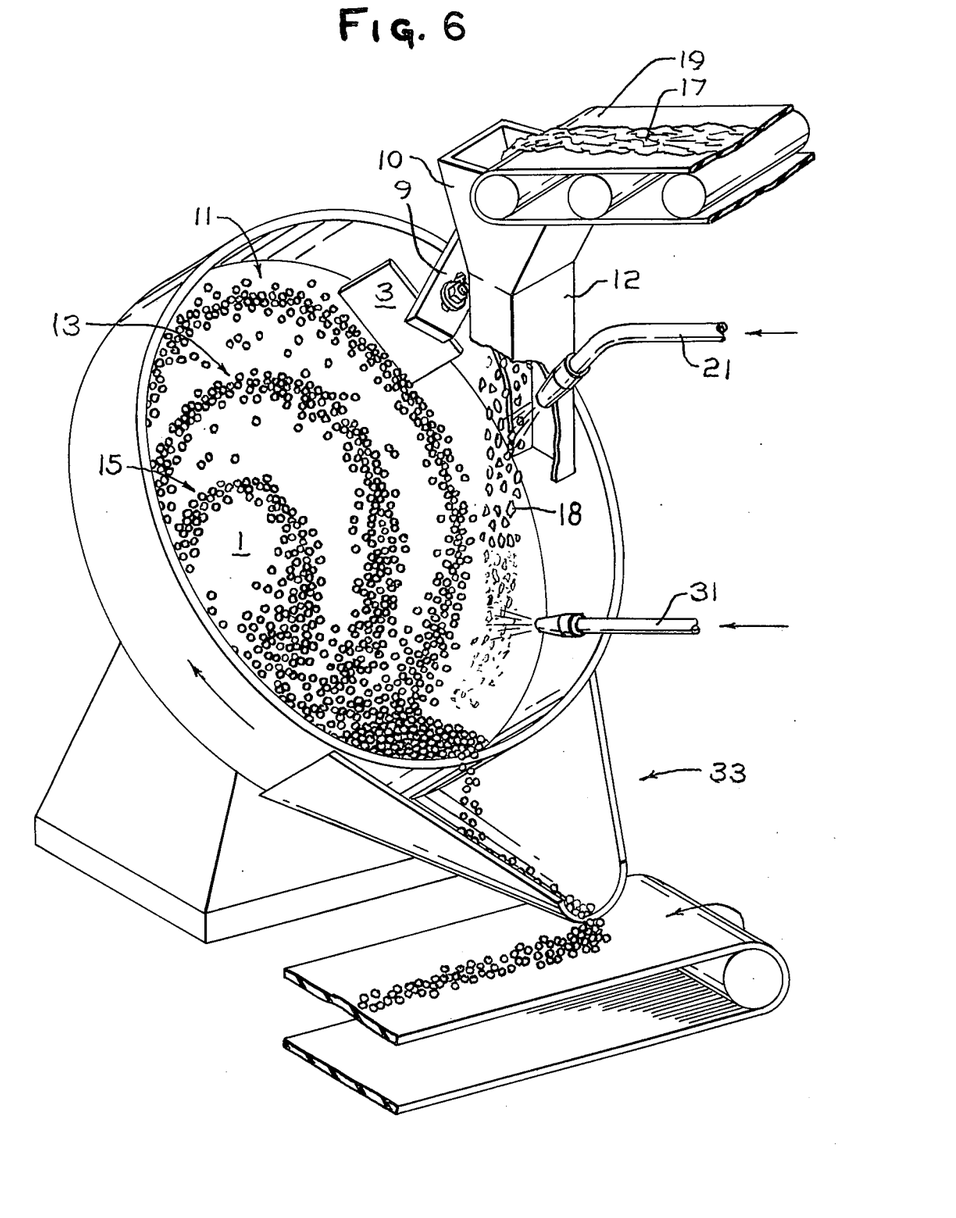

The concentrated caustic may be sprayed onto the pan at approximately the two to three o'clock position shown by 21 in the drawings, and in a certain distance from the rim. For continuous pelletization on a one meter diameter pan, the distance in from the rim is about 6 inches. It is estimated that for various sized pans, the distance in should be about 1/6 to ⅛ of the pan diameter. An alternate approach, shown in FIGS. 5 and 6, is to spray the falling dry batch 18 as it is falling within a delivery chute 12.

The caustic handling system should be designed so that it delivers a continuous flow of caustic at an extremely steady rate. As has been mentioned above with regards to the batch feed, a steady caustic flow is also necessary to achieve pellets of a consistent predetermined composition. By the term consistent composition, it is meant that there will be essentially no variation in composition from pellet to pellet. Consistency of composition is needed in pellets for the production of high quality flat glass. Variation in pellet composition will result in deterioration of overall glass quality and lead to conditions of striae or ream in the glass ribbon.

Since the caustic is an extremely corrosive material and will freeze at too low a temperature, care must be taken that no corrosion or frozen caustic will plug the delivery lines and impede flow of caustic to the pan. To maintain a steady balling action and consistency in pellet composition, the relative rate of flow must be constant. The slightest variation in caustic flow will show up in the composition of the pellets and also in a change in ball size of the pellets being produced. To insure a steady flow, the caustic is delivered to the pan in heated lines and sprayed onto the pan under pressure of about 20 pounds per square inch gauge. The rate at which caustic is delivered to the pan will depend on the amount of alkali metal oxide required in the pellet and on the rate of flow of dry particulate glass batch. It has been found that variations in either the flow of caustic or the flow of solids relative to each other dramatically and seriously affect conditions of pelletizing on the disc. Variations in either caustic or solids flow not only cause compositional differences in the pellets but also change liquid content on the disc causing a shift in the size of pellets produced. Therefore, to control pelletizing conditions on the pan so that the production of uniformly sized pellets with consistent compositions are produced, it is desirable that the caustic and dry particle flows be controlled in such a relationship that variation in the flow of either one will produce a compensating variation in flow of the other. For example, to insure the close control on caustic and dry batch flow, a caustic delivery system would preferably be capable of delivering a steady rate of flow of caustic to the pan such that the flow of caustic does not vary more than ± 0.01 pound of caustic measured as NaOH for each pound of particulate solids fed to the pan.

It has been found in the practice of this invention that in order to maintain stable pelletizing action on the disc, the moisture content of the materials on the disc should be controlled to about 5 to 10, preferably 5 to 7 percent by weight as measured by the moisture content of the product pellets as they are removed from the disc. By the term "stable pelletizing" is meant that uniformly sized products of substantially constant composition are continuously produced. With a stable pan, the size of the pellets being continuously produced can be changed by slightly adjusting the moisture content on the disc. For example, if it is desired to produce slightly larger pellets, the moisture content can be slightly increased within the above recited range and conversely, if slightly smaller pellets are desired, the moisture content can be decreased. Thus, the pellet size can be changed during the course of the continuous process without losing or destroying the balling action. By the term "uniformly sized pellets" is meant that at least about 80 percent of the pellets are formed of a pellet size within ± 25 percent of a nominal size. Higher moisture contents on the pan, that is, higher than 10 percent moisture in the pellets, tend to give a "wet pan" which leads to sticking of the batch on the disc and the formation of large irregularly shaped agglomerates. Significantly lower moisture conditions on the pan, that is, lower than 5 percent moisture in the pellets, result eventually in either no pelletizing at all or in the formation of small brittle agglomerates.

The moisture content on the disc is determined principally by the caustic addition. Additional water, referred to as trim water, may optionally be added to the pan as needed for the purpose of controlling the balling action. The water, in an amount of up to 5 percent by weight based on total weight of ingredients on the pan, can be added in the form of a liquid spray or alternately in the form of steam. Steam transfers heat to the disc and thereby permits more of the caustic on the pan to remain in the liquid phase, thus minimizing the amount of additional water needed.

As shown by numeral 31 in FIG. 1, water in the form of a liquid spray or steam should be fed onto the disc at about the five o'clock position and in from the rim about 1/6 to 1/8 of the diameter of the disc. Preferably, the water is added on a continuous basis, although it can be fed to the pan in a discontinuous manner, whichever way is necessary to promote and maintain the smooth production of pellets. In general, the water will be added to control the balling action, and it is varied for that reason. If the pellets produced are too large, the water addition is cut back; if the pellets are too small, the water feed is increased.

The liquidity of the pelletizing mixture is percent by weight of liquid in the pelletizing mixture. The liquidity is due to the free water and the liquid caustic. Since part of the water in the pelletizing mixture forms hydrates with sodium carbonate and frozen caustic, and part of the liquid caustic freezes, the liquidity of the pelletizing mixture at any particular time is difficult to determine. However, the initial amount of liquid, in the form of water and liquid caustic added initially to the pelletizing pan, can readily be determined. It has been found that the initial amount of liquid added to the disc (initial liquidity) in the form of caustic and water should be within the range of 15–25 percent, preferably 19–23 percent by weight based on total weight of the pelletizing mixture (dry batch, caustic soda and water). Higher initial liquidities, that is, higher than 25 percent by weight, give too wet a pelletizing mixture leading to the production of large, irregularly shaped agglomerates. Lower initial liquidities, i.e., lower than 15 percent by weight, result in the formation of small, brittle agglomerates.

During the course of the pelletizing process, the mixture of particulate glass batch material and caustic rolls around the rotating disc with the particles of batch tumbling over one another and being bound together by the caustic. Since the tumbling mixture of materials is sticky due to the caustic, and tends to adhere to the surface of the disc, a plurality of plows may be disposed on the disc to scrape the mixture of material from the surface of the pan. As is shown in the drawings, plows 3, 5 and 7 are disposed into the rolling mixture of material and are supported by and extend downwardly from a support member 9 which extends over the rotating disc. The plows are positioned so that they either barely scrape the surface of the disc or are slightly above the pan surface about 1/8 of an inch or so. The plows are located in the upper portion of the disc, more specifically, where the rolling mixture of materials is beginning to fall downwardly on the pan. The plows shown in FIGS. 1, 2, and 5 are arranged somewhat as follows: Considering the face of the rotating disc as the face of a clock, plow 3 is placed at the one o'clock position adjacent to the rim of the rotating disc to scrape any glass batch material which may be sticking to the rim. Plow 7 is located at the approximate center of the disc, and plow 5 is located between plows 3 and 7 at approximately ¼ to ½ the distance between plows 3 and 7. Besides scraping the surface of the disc, plows 3, 5 and 7 also assist in separating and directing the flow of material about the pan. For this purpose, these plows are aligned to the flow of material so that the material will be directed inwardly away from the rim of the pan. FIG. 6 shows an alternate plow arrangement utilizing a single plow 3 located close to the rim at about one o'clock.

If the pellets are to be stored, they should be dried to harden their surfaces before storage. The product pellets, as they are continuously collected from the pan, are quite moist and tacky, and will stick together in storage if their surfaces are not case hardened. Drying can be accomplished in air at ambient temperature or by passing air at 200° F. or lower over the pellets. Drying can, of course, be conducted at higher temperatures, as high as 1000° F., without danger of the pellets exploding, although temperatures of up to 500° F. are rarely exceeded.

It does not appear that the reaction of caustic soda with dolomite and limestone is pushed any further in the direction of formation of sodium carbonate and calcium and magnesium hydroxides as the result of drying since the extent of caustic reacted is identical in both undried and dried pellets, i.e., about 45 percent. Also, there is no significant amount of carbonation of caustic by $CO_2$ in the dryer. Evidently the pellets are too impervious for any significant reaction with $CO_2$.

EXAMPLE I

Pellets of glass batch were prepared by feeding sand, dolomite, limestone, salt cake, coal, rouge and caustic to a rotating disc pelletizer on a continuous basis.

The process was carried out on a one meter diameter pelletizing disc. The disc was operated at a clockwise speed of about 16 revolutions per minutes and at an angle of inclination from the horizontal of about 45°. Located on the disc such as shown in FIG. 1 were three steel plows. The plows were positioned such that one was scraping the rim of the disc at approximately the one o'clock position. The second plow was in the approximate center of the disc and the third plow was located between the first two at a position approximately ½ of the way between the rim and the center plow.

The dry batch ingredients contain 74.0 percent sand, 17.9 percent dolomite, 6.2 percent limestone and 1.9 percent salt cake. Small amounts, that is, less than 0.1 percent coal and rouge, were also present. The sand used was unground and naturally occurring McLish sand from Oklahoma having a particle size gradation such that 100 percent was −50 mesh with about 54 percent −100 mesh. The specific particle size distribution was as follows:

| Mesh | Percent by Weight |
| --- | --- |
| +50 | 0 |
| +80 | 12 |
| +100 | 34 |
| +140 | 42 |
| +200 | 10 |
| −200 | 2 |

The limestone and dolomite used was finer than that normally used in the production of flat glass. The particle size gradation of the limestone was 97 percent −80 mesh with about 74 percent −200 mesh. The dolomite was about 96 percent −80 mesh with about 64 percent −200 mesh. The specific particle size distributions of the dolomite and limestone were as follows:

| Dolomite | | Limestone | |
| --- | --- | --- | --- |
| Mesh | Percent by Weight | Mesh | Percent by Weight |
| +80 | 4 | +100 | 11 |
| +100 | 7 | +200 | 15 |
| +140 | 7 | −200 | 74 |
| +200 | 18 | | |
| −200 | 64 | | |

The salt cake, rouge and coal sizes were about the same as are normally used in the production of flat glass. The dry batch ingredients which were premixed with one another in an Eirich-type mixer were fed on a continuous belt to the rotating disc at the four o'clock position and in from the rim about 6 inches. The feed rate was maintained at about 12 pounds per minute.

A 73 percent by weight aqueous sodium hydroxide solution was sprayed onto the disc, such as shown in FIG. 1, at approximately the two o'clock position and in from the rim about 6 inches. The temperature of the caustic solution was about 85° C. and the feed rate wasmaintained at about 2.8 pounds per minute. The caustic handling system was especially designed to provide an extremely steady rate of flow of caustic to the disc such that the flow of caustic did not vary more than ±0.01 pounds of 73 percent caustic calculated as $Na_2O$ for each pound of particulate solids fed to the disc.

The caustic handling system consists of a reservoir for the caustic, which was, in this example, a 55 gallon drum, and an intermediate stay-warm pot from which point the caustic was fed to the disc. The caustic in the drum was heated with steam coils and heating belts to keep the caustic above its freezing point (63° C.). From the reservoir, caustic was fed to a stay-warm pot which contains up to 140 pounds of caustic. The stay-warm pot is electrically heated and positioned on a set of scales to measure the decrease in weight as the caustic is fed to the disc. The caustic was blown from the stay-warm pot with 20 pounds per square inch guage of nitrogen pressure through a steam traced line which led to the rotating disc. The caustic was sprayed onto the disc through a spray nozzle. Thus, with the constant nitrogen pressure and with the spray nozzle serving to control the flow of caustic to the disc, there was a constant pressure at the spray nozzle to insure that there would be constant flow of caustic. To confirm that the flow was constant, loss of weight in the stay-warm pot was measured every two minutes. From this, the amount of caustic which had been blow out of the stay-warm pot per minute could be calculated. The stay-warm pot is usually recharged with about 100 pounds of caustic at a time, again while maintaining a constant pressure and flow ofcaustic through the spray nozzle.

Water in the form of a liquid spray was fed onto the rotating disc at the five o'clock position and from the rim about 6 inches. The water flow was conducted continuously and simultaneously with the caustic and dry particulate feed. The rate of flow was changed periodically to provide the proper amount of liquid phase on the disc so as to promote and maintain the smooth production of pellets.

The operation as described above resulted in the smooth, continuous production of ⅜ to ⅝ inch diameter pellets. The product discharged from the disc at about 900 pounds per hour. Immediately after the product pellets were discharged from the disc, a sample was taken from the disc, dried and analyzed. The moisture content was determined to be about 6 percent by weight.

From the amount of caustic added to the pan, 5 percent of the moisture in the pellet was due to the caustic addition. The remaining 1 percent of the moisture was due to the water trim.

EXAMPLE II

A glass batch was prepared by feeding sand below 100 mesh, United States Sieve Series, dolomite, limestone, salt cake, coal and rouge to a pan pelletizer on a continuous basis. The dry batch contained 73.9 percent by weight sand, 6.2 percent by weight limestone, 17.9 percent by weight dolomite, 0.09 percent by weight roughe, 0.07 percent by weight coal and 1.85 percent by weight salt cake. These solid ingredients were mixed and fed to the surface of the rotary pelletizer of the type shown in FIG. 4. A 60 percent solution of sodium hydroxide at a temperature of 60° C. and a quantity sufficient to provide a $Na_2O$ content in the batch of 10.23 percent by weight was fed into the dry ingredients as they were being dropped to the surface of the pelletizer. The moisture content basis of the finished batch was about 8.8 percent by weight. The disc on the rotary pan pelletizer was rotated continuously and batch was passed to the surface thereof. The disc was 39 inches in diameter. Pellets ranging in size from ⅜ to ⅝ inch in diameter were formed and melted to a glass having the composition shown in Table I.

EXAMPLE III

Pellets of glass batch were prepared by feeding coarse sand, fine dolomite, fine limestone, salt cake, coal, rouge and hot aqueous caustic soda to a rotating disc pelletizer on a continuous basis.

The process was carried out on an 8-foot diameter pelletizing disc. The disc was operated at a clockwise speed of 16 revolutions per minute and at an angle of inclination from the horizontal of about 48°. Located on the disc such as is shown in FIG. 1 were three steel plows or baffles. The baffles were positioned such that one was scraping the rim of the disc at approximately the one o'clock position. The second baffle was in the approximate center of the disc and the third baffle was located between the first two at a position approximately ½ of the way between the rim and the center baffles.

The dry batch ingredients contained on a weight basis 73.3 percent sand, 17.8 percent dolomite, 6.2 percent limestone and 2.6 percent salt cake. Small amounts, that is, less than 0.2 percent coal and rouge were also present. The sand used was one conventionally used in flat glass batches and had the following particle size range:

+30 mesh, 0 percent by weight
+60 mesh, 47 percent by weight
+100 mesh, 41 percent by weight
+100 mesh, 12 percent by weight The limestone and dolomite used was finer than that normally used in the production of flat glass. Particle size graduation of the limestone and dolomite was as follows:

| Dolomite | Limestone |
| --- | --- |
| +60 mesh, 0 percent by weight | +60 mesh, 1 percent by weight |
| +100 mesh, 1 percent by weight | +100 mesh, 3 percent by weight |
| +200 mesh, 18 percent by weight | +200 mesh, 10 percent by weight |

-continued

| Dolomite | Limestone |
|---|---|
| −200 mesh, 81 percent by weight | −200 mesh, 86 percent by weight |

The salt cake, rouge and coal sizes were about the same as normally used in the production of flat glass. The dry batch ingredients were premixed in a conventional batch-type mixer and were fed on a continuous basis to a rotating disc at the four o'clock position and in from the rim about 12 inches. The feed rate was maintained at about 100 pounds per minute.

A 73 percent by weight commercially available aqueous sodium hydroxide solution was sprayed onto the disc such as is shown in FIG. 1, at approximately the three o'clock position and in from the rim about 12 inches. The temperature of the caustic solution was about 185° F. and the feed rate was maintained at about 22.5 pounds per minute. The caustic handling system was especially designed to provide an extremely steady rate of flow of caustic to the pan such that the flow of caustic did not vary more than ± 0.01 pound of caustic calculated as NaOH for each pound of particulate solids fed to the disc. The caustic feed system and the dry batch feed system were coordinated with one another such that a change in the rate of feed of one was accompanied by a corresponding change in the rate of feed of the other so that at all times the flow of caustic and dry batch material would result in a constant composition on the rotating disc.

Trim water in the form of a liquid spray was fed onto the rotating disc at the five o'clock position and in from the rim about 12 inches. The water flow was conducted intermittently with the caustic and dry particulate feed to control the balling action on the disc to provide the proper amount of liquid phase on the pan so as to promote and maintain the smooth production of pellets. The moisture content on the pelletizing disc was about 7 percent as determined by the moisture content of the freshly formed pellets.

The operation as described above resulted in the smooth, continuous production of ¼ to ¾ inch diameter pellets. The product discharge from the disc at about 7350 pounds per hour.

The freshly formed pellets were dried by passing them through a continuous-type dryer on a conveyor belt at dryer temperatures of about 400° to 500° F. for about 20 to 30 minutes. The dry pellets had a bulk density of about 72 pounds per cubic foot and an average crush strength of about 125 pounds per inch diameter as determined by crushing 20 individual pellets between hardened steel plates on an Instron machine and reporting the crush strength as an average value. The steel plates crushed the pellets at a rate of about 0.02 inch per minute.

The dry pellets were then melted to form a glass. The caculated and actual compositions of the glass, the actual composition determined by X-ray fluorescence analysis, were as follows:

| Component | Percent by Weight on the Oxide Basis | |
|---|---|---|
| | Calculated Composition | Actual Composition |
| $SiO_2$ | 73.03 | 73.20 |
| $Na_2O$ | 13.81 | 13.92 |
| CaO | 8.78 | 8.54 |
| MgO | 3.84 | 3.72 |
| $SO_3$ | 0.33 | 0.39 |
| $Fe_2O_3$ | 0.09 | 0.10 |

-continued

| Component | Percent by Weight on the Oxide Basis | |
|---|---|---|
| | Calculated Composition | Actual Composition |
| $Al_2O_3$ | 0.12 | 0.10 |

Pellets prepared in accordance with the above examples were found to be fast melting when subjected to temperatures sufficient to melt the glass batches. Thus, when compared to batch ingredients of the same composition which have not been pelletized, the pellets show a faster melting rate. Utilization of the glass pellets prepared in accordance with this invention thus leads to an easily handled batch which also provides a considerable saving in heat costs due to its faster melting characteristics when compared with loose batch of identical composition.

While the invention has been described with reference to certain specific examples and illustrative embodiments, it is not intended to be limited thereby except insofar as appears in the accompanying claims.

It should also be evident that while the invention has been described and claimed with specific reference to a clockwise rotating pan, it would be entirely equivalent to operate with a mirror image of the arrangements shown in the drawings, in which case rotation would be counter-clockwise.

I claim:
1. A method for forming particulate glass batch material into pellets having a controlled selected size range, comprising:
  a. rotating in a clockwise direction a pelletizing disc inclined at about 40° to 55° from horizontal;
  b. depositing onto the disc at approximately a four o'clock position a dry particulate glass batch mixture including sand, fine ground limestone, and fine ground dolomite, the mixture being at least about 20 percent by weight finer than 100 mesh and at least 15 percent by weight finer than 200 mesh;
  c. spraying onto the disc on aqueous solution of 50 to 75 percent by weight alkali metal hydroxide;
  d. permitting the materials deposited onto the disc and contacted with the alkali metal hydroxide solution to roll the disc and tumble over one another to form pellets of said dry mixture which are bound together by said aqueous solution;
  e. controlling the relative flow rates of the dry glass batch mixture and the aqueous hydroxide solution in (b) and (c) above soas to produce uniformly sized pellets with uniform compositions;
  f. controlling the moisture content of the materials on the disc so as to produce pellets having a moisture content of about 5 to 10 percent by weight; and
  g. removing said pellets fom the disc as they attain a selected size range.

2. The method of claim 1 further including adding water onto the disc at about a five o'clock position, in from the perimeter of the disc about 1/6 to 1/7 of the diameter of the disc, as a separate feed, so as to aid said controlling of the moisture content of the materials on the disc.

3. The method of claim 1 in which said aqueous solution of alkali metal hydroxide is sprayed onto said rolling batch materials on said pelletizing disc at about a two o'clock position, in from the perimeter of the disc about 1/6 to 1/7 of the diameter of the disc.

4. The method of claim 1 in which said aqueous solution of alkali metal hydroxide is sprayed onto said dry glass batch mixture as the dry glass mixture is being deposited onto said pelletizing disc.

5. The method of claim 1 wherein the aqueous solution of alkali metal hydroxide being sprayed onto said pelletizing disc is 73 percent by weight aqueous sodium hydroxide solution and is at a temperature of 60° C. to 90° C.

6. The method of claim 1 wherein the limestone and dolomite being deposited onto the disc each have at least 65 percent by weight minus 100 mesh and at least 50 percent by weight minus 200 mesh.

7. The method of claim 6 wherein about 40 to 70 percent by weight of the sand being deposited is between 30 and 60 mesh, with about 20 to 50 percent by weight being between 60 and 100 mesh, with no more than 15 percent by weight being finer than 100 mesh.

8. The method of claim 6 in which the sand has the following particle size distribution:

| Mesh | Percent by Weight |
|---|---|
| +50 | 0–10 |
| −50 +80 | 5–15 |
| −80 +100 | 25–40 |
| −100 +140 | 35–55 |
| −140 +200 | 5–35 |
| −200 +325 | 5–35 |
| −325 | 0–25 |

9. The method of claim 8 in which the sand is a McLish sand.

10. The method of claim 6 in which the dolomite and limestone have the following particle size distributions:

| | Dolomite | | Limestone |
|---|---|---|---|
| Mesh | Percent by Weight | Mesh | Percent by Weight |
| +80 | 0–4 | +100 | 0–15 |
| −80 +100 | 0–7 | −100 +200 | 5–25 |
| −100 +140 | 2–10 | −200 +325 | 20–85 |
| −140 +200 | 10–30 | −325 | 10–75 |
| −200 +325 | 20–70 | | |
| −325 | 10–65 | | |

* * * * *

UNITED STATES PATENT AND TRADEMARK OFFICE
CERTIFICATE OF CORRECTION

PATENT NO. : 4,031,175
DATED : June 21, 1977
INVENTOR(S) : Joseph E. Cooper

It is certified that error appears in the above-identified patent and that said Letters Patent are hereby corrected as shown below:

Column 18, line 47, "on" should be --an--.

Column 18, line 51, after "roll" please insert --on--.

Column 18, line 56, "soas" should be --so as--.

Signed and Sealed this

Twentieth Day of September 1977

[SEAL]

Attest:

RUTH C. MASON
Attesting Officer

LUTRELLE F. PARKER
Acting Commissioner of Patents and Trademarks